(12) United States Patent
LaGana

(10) Patent No.: US 11,933,406 B2
(45) Date of Patent: Mar. 19, 2024

(54) STEERING RACK AND PROTECTIVE BELLOWS

(71) Applicant: Robert Bosch GmbH, Stuttgart (DE)

(72) Inventor: Nicholas LaGana, Canton, MI (US)

(73) Assignees: Robert Bosch Automotive Steering LLC, Florence, KY (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/943,946

(22) Filed: Sep. 13, 2022

(65) Prior Publication Data

US 2023/0110871 A1   Apr. 13, 2023

Related U.S. Application Data

(60) Provisional application No. 63/250,416, filed on Sep. 30, 2021.

(51) Int. Cl.
*F16J 3/04* (2006.01)
*B62D 3/12* (2006.01)

(52) U.S. Cl.
CPC .............. *F16J 3/04* (2013.01); *B62D 3/126* (2013.01)

(58) Field of Classification Search
CPC ..... F16J 3/04; F16J 3/041; B63D 3/12; B62D 3/126
See application file for complete search history.

(56) References Cited

U.S. PATENT DOCUMENTS

| 4,570,964 A | 2/1986 | Taytay et al. |
| 5,176,390 A * | 1/1993 | Lallement ................. F16J 3/041 403/50 |

(Continued)

FOREIGN PATENT DOCUMENTS

| DE | 4142194 A1 * | 7/1993 | ............... F16J 3/041 |
| DE | 102018214173 | 3/2019 | |

(Continued)

OTHER PUBLICATIONS

Description Translation for JP 2005/125832 from Espacenet (Year: 2005).*

(Continued)

*Primary Examiner* — Jason D Shanske
*Assistant Examiner* — Daniel M. Keck
(74) *Attorney, Agent, or Firm* — Kelly McGlashen; Maginot, Moore & Beck LLP

(57) ABSTRACT

One aspect of this disclosure is directed to a steering system comprising a housing in which a steering rack is movably arranged and extends out of the housing on at least one side of the housing, the steering rack being connected with a tie rod via a ball joint, wherein the connection is covered by a protective bellows defining a central axis and the bellows further comprising a first end defining a first opening around the central axis, a second end defining a second opening around the central axis, and several annular folds arranged along the central axis between the first end and second end, and wherein the bellows comprises a plurality of skirts arranged along the central axis and extending away from the bellows.

Another aspect of this disclosure is directed to a protective bellows defining a central axis and comprising a first end defining a first opening around the central axis, a second end defining a second opening around the central axis, and several annular folds arranged along the central axis between the first end and second end, and the bellows comprises a plurality of skirts arranged along the central axis.

10 Claims, 2 Drawing Sheets

(56) References Cited

U.S. PATENT DOCUMENTS

| | | |
|---|---|---|
| 5,499,550 A | 3/1996 | Westphal et al. |
| 6,322,085 B1 | 11/2001 | Martin et al. |
| 6,386,551 B1 | 5/2002 | Martin |
| 6,951,336 B2 | 10/2005 | Martin |
| 8,550,740 B2 | 10/2013 | Brunneke et al. |

FOREIGN PATENT DOCUMENTS

| | | | |
|---|---|---|---|
| EP | 0327347 | | 5/1995 |
| GB | 1081265 | | 8/1967 |
| JP | 2005125832 A | * | 5/2005 |
| JP | 2010202020 A | * | 9/2010 |
| JP | 2020006843 A | * | 1/2020 |
| WO | 0184021 | | 11/2001 |
| WO | 2014040778 | | 3/2014 |

OTHER PUBLICATIONS

Description Translation for JP 2010/202020 from Espacenet (Year: 2010).*

\* cited by examiner

STEERING RACK AND PROTECTIVE BELLOWS

TECHNICAL FIELD

The present invention relates to vehicle steering rack construction and more particularly to a protective bellows.

BACKGROUND

Steering systems whose ends stick out of a steering system housing and are connected to tie rods via ball joints. Protective bellows are used to cover and protected these connections. Particularly in harsher environments there is an increased risk of being punctured punctures by sticks or rocks that get thrown up. This allows water and contaminants to enter the steering system. Punctured bellows will require the Steering system to eventually be replaced if not repaired in time.

SUMMARY

One aspect of this disclosure is directed to a Steering system comprising a housing in which a steering rack is movably arranged and extends out of the housing on at least one side of the housing, the steering rack being connected with a tie rod via a ball joint, wherein at least the part of the steering rack extending outside of the housing and the ball joint are covered by a protective bellows defining a central axis and the bellows further comprising a first end defining a first opening around the central axis, a second end defining a second opening around the central axis, and several annular folds arranged along the central axis between the first end and second end, and wherein the bellows comprises a plurality of skirts arranged along the central axis and extending away from the bellows.

Another aspect of this disclosure is directed to a protective bellows defining a central axis and comprising a first end defining a first opening around the central axis, a second end defining a second opening around the central axis, and several annular folds arranged along the central axis between the first end and second end, and the bellows comprises a plurality of skirts arranged along the central axis.

In some embodiments, each of the skirts defines an angle of less than 180°.

In some embodiments, the skirts are arranged on at least some of the folds.

In some embodiments, the skirts are arranged on outer bends of the at least some folds.

In some embodiments, each fold comprises at least an outer bend with an outer diameter and an adjacent inner bend with an outer diameter, the outer bend and adjacent inner bend are connected with a first flank, each skirt has an outer diameter and the value of an outer diameter of a skirt subtracted by an outer diameter of an adjacent outer bend is at least equal to the value of the diameter of an outer bend subtracted by the outer diameter of the adjacent inner bend.

In some embodiments, each skirt defines an axial extension along the central axis and the axial extension of each skirt is at least as big as the axial distance along the central axis between the outer bend from which the skirt extends to the neighboring outer bend which is arranged next to the outer end of the respective skirt when the bellows is extended to its maximum operational length.

In some embodiments, each skirt encloses an angle with the central axis that is not bigger than an angle that an adjacent first flank between an outer bend and an inner bend encloses with the central axis when the bellows is extended to its maximum operational length.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
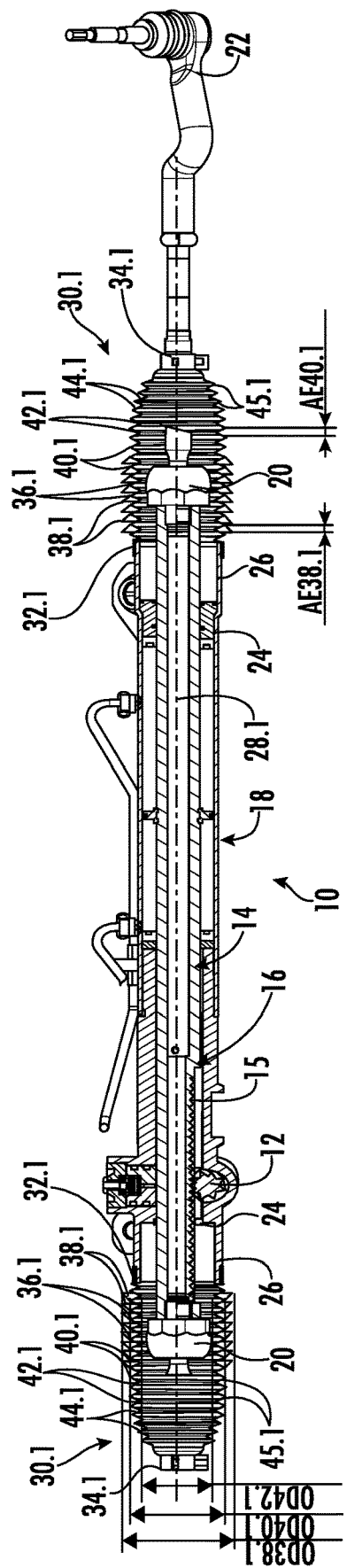
FIG. 1 depicts a longitudinal section of parts of a steering rack assembly according to a first embodiment of the invention.

A partial longitudinal section of a steering system or steering rack assembly 10 is shown in FIG. 1. It may be a power steering system or a manual steering system. The steering rack assembly 10 includes a pinion 12 and a steering rack 14. The pinion 14 is in engagement with teeth 15 of a toothed member 16 of the steering rack 14. The steering rack 14 has the shape of a hollow tube. But solid steering racks or steering racks with different cross sections may be used as well. The steering rack 14 is mounted in a tubular housing 18. Ball joints 20 are attached on each axial end of the steering rack 14. Each ball joint 20 is connected to a tie rod 22 of which only one is shown. The steering rack 14 is supported by two bearings 24 that are located inside the housing 18. The housing 18 has end sections 26 that extend beyond the bearings 24. The steering rack 14 is movably arranged and extends out of the housing 18 on both sides but should extend at least on one side of the housing 18. The steering rack 14 and housing 18 define a longitudinal or central axis 28.1 along which the steering rack 14 travels in operation.

The sections of the steering rack 14 extending outside of the housing 18, the ball joints 20 and the part of the tie rods 22 adjacent to the ball joints 20 are covered by protective bellows 30.1. The bellows 30.1 in automotive applications are also called gaiters or boots. Alternatively, if the ball joints 20 are sufficiently sealed, the bellows 30.1 may be attached to the ball joints 20 and not on the adjacent part of the tie rods 22. The bellows 30.1 cover therefore at least the steering rack 14 extending outside of the housing 18 and the ball joints 20 or in addition sections of the tie rods 22. The bellows 30.1 also define the central axis 28.1. It shall be noted that the central axis 28.1 may be angled at the ball joint 20 due to the suspension of a vehicle moving up and down and/or the wheels of a vehicle being turned. The bellows 30.1 further comprise a first end 32.1 defining a first opening around the central axis 28.1 and a second end 34.1 defining a second opening around the central axis 28.1. The first ends 32.1 are connected to the outside of the end sections 26 of the housing 18, for example with a crimp connection. The second ends 34.1 are connected to the tie rods 22. Several annular folds 36.1 are arranged along the central axis 28.1 between the first end 32.1 and second end 34.1. The bellows 30.1 also comprise a plurality of skirts 38.1 arranged along the central axis 28.1. The skirts 38.1 extend away from the bellows 30.1 and are opening towards the first end 32.1 or the end section 26. The skirts 38.1 define a frustoconical shape. This will be described in more detail for the second and third embodiment. In the first embodiment, the bellows 30.1 have 17 folds 36.1. Beginning at the first end 32.1, the first 13 folds 36.1 have the same outer diameter. The outer diameters of the next four folds 36.1 decrease towards the second ends 34.1 which is arranged around the tie rods 22. Skirts 38.1 are arranged on eight of the folds 36.1, notably on the second to ninth fold. But it may be possible to arrange skirts 38.1 on more or fewer of the folds 36.1. The skirts 38.1 open towards the first end 32.1 which is connected to the end section 26 of the housing 18. The skirts 38.1 are arranged on outer bends 40.1 of at least some folds 36.1.

Each skirt 38.1 encloses an angle with the central axis 28.1 that is not bigger than an angle that an adjacent first flank 44.1 between an outer bend 40.1 and an inner bend 42.1 encloses with the central axis 28.1 when the bellows 30.1 is extended to its maximum operational length. In the depicted first embodiment, each of the skirts 38.1 defines an angle of less than 180°, in the depicted example the angle is approximately 120°.

Each fold 36.1 comprises at least the above mentioned outer bend 40.1 with an outer diameter and an adjacent inner bend 42.1 with an outer diameter. The outer bend 40.1 and one adjacent inner bend 42.1 are connected by a first flank 44.1. Neighboring combinations of an outer bend 40.1, first flank 44.1 and inner bend 42.1 are connected with a second flank 45.1. Each skirt 38.1 has an outer diameter. The value of an outer diameter of a skirt 38.1 subtracted by the outer diameter of an adjacent outer bend 40.1 is at least equal to the value of the outer diameter of an outer bend 40.1 subtracted by the outer diameter of the adjacent inner bend 42.1. This insures an increased overlap of the skirts 38.1 over the folds 36.1. That increased overlap results in more material of the bellows 30.1 to better protect the connections 29 and the bearings 24 for the steering rack 14. On impact of an object the skirts 38.1 may deflect the object or absorb some of the impact energy to protect the folds 36.1 of the bellows 30.1.

Each skirt 38.1 defines an axial extension along the central axis 28.1. The axial extension AE38.1 of each skirt 38.1 is at least half as big as the axial distance AD40.1 along the central axis 28.1 between the outer bend 40.1 from which the skirt 38.1 extends to the neighboring outer bend 40.1 which is arranged next to the outer end of the respective skirt 38.1 when the bellows 30.1 are extended to their maximum operational length. The maximum operational length is the length of the bellows 30.1 when a wheel is turned to its maximum angle in one direction. The minimum length of a bellows 30.1 is achieved when that same wheel is turned to the maximum angle in the opposite direction. For example, the bellows 30.1 on the right side of a car may be stretched to its maximum operational length when the right wheel is turned to the left and to its minimal operational length when the wheel is turned to the right. The bellows 30.1 may yet be stretched further without being damaged.

Figure 2:
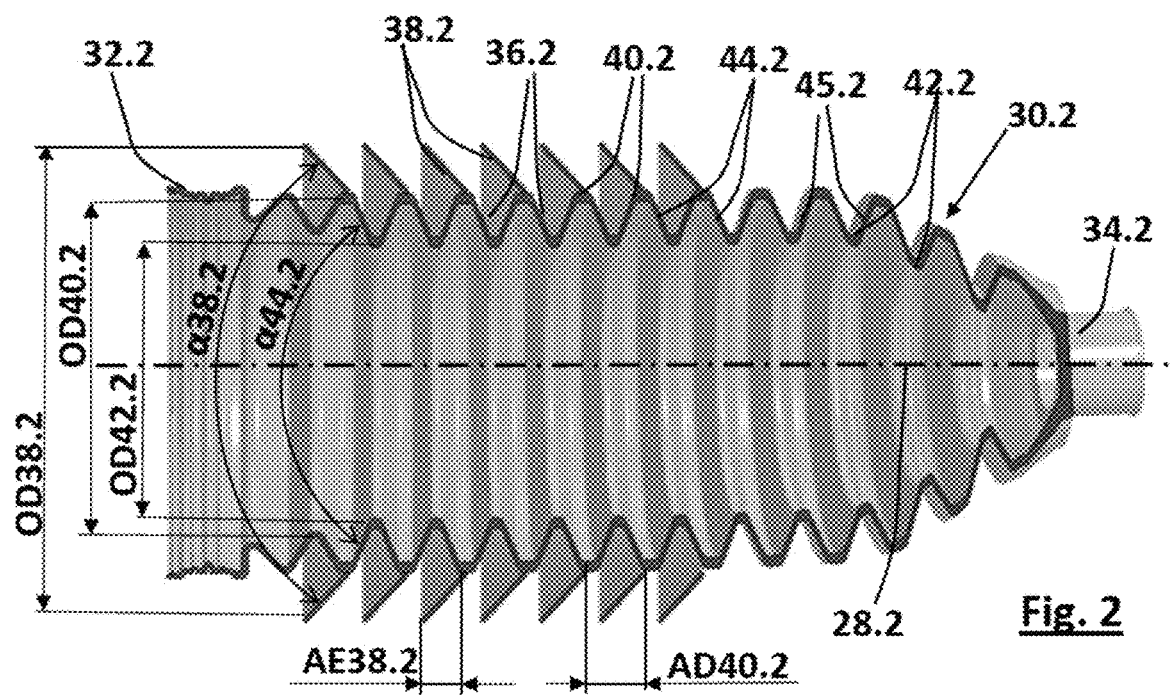
FIG. 2 depicts a bellows according to a second embodiment of the invention.

FIG. 2 depicts a partial longitudinal section of a second embodiment of a bellows 30.2. The bellows 30.2 defines a central axis 28.2. The central axis 28.2 may be bent or curved due to angular movement of the tie rod 22. The bellows 30.2 comprises a first end 32.2 defining a first opening around the central axis 28.2 and a second end 34.2 defining a second opening around the central axis 28.2. The first end 32.2 may be connected to the outside of the end sections 26 of the housing 18. The second end 34.2 may be connected to the tie rod 22. Several annular folds 36.2 are arranged along the central axis 28.2 between the first end 32.2 and second end 34.2. The bellows 30.2 comprises a plurality of skirts 38.2 arranged along the central axis 28.2. The skirts 38.2 extend away from the bellows 30.2 and their open ends may face the first end 32.2 or, when mounted, the end sections 26 of the housing 18. The bellows 30.2 have 13 folds 36.2. Beginning at the first end 32.2, the first ten folds 36.2 have the same outer diameter. The outer diameters of the next three folds 36.2 decrease towards the second end 34.2. Skirts 38.2 are arranged on seven of the folds 36.2, notably on the second to ninth fold. But it may be possible to arrange skirts 38.2 on more or fewer of the folds 36.2. The skirts 38.2 open towards the first end 32.2 which can be connected to the end section 26 of the housing 18. The skirts 38.2 are arranged on outer bends 40.2 of at least some folds 36.2. An inner edge of the skirts 38.2 is attached to the center of a center portion of the outer bends 40.2. The inner edge is followed by an angled portion that defines a frustoconical shape and ends in an outer annular rim.

The skirts 38.2 angles $\alpha 38.2$ of less than 180°, in the depicted example the angle is approximately 120°. Each skirt 38.2 encloses the angle $\alpha 38.2$ with the central axis 28.2 that is not bigger than an angle $\alpha 44.2$ that an adjacent first flank 44.2 between an outer bend 40.2 and an inner bend 42.2 encloses with the central axis 28.2 when the bellows 30.2 is extended to its maximum operational length. Adjacent combinations of an outer bend 40.2, first flank 44.2 and inner bend 42.2 are connected with a second flank 45.2. The first flanks 44.2 have a diameter that increases towards the first end 32.2, the second flanks 45.2 have a diameter that increases towards the second end 34.2.

Each fold 36.2 comprises at least the above mentioned outer bend 40.2 with an outer diameter OD40.2 and an adjacent inner bend 42.2 with an outer diameter OD42.2. The outer bend 40.2 and one adjacent inner bend 42.2 are connected by a first flank 44.2. Each skirt 38.2 has an outer diameter OD38.2. The value of an outer diameter OD38.2 of a skirt 38.2 subtracted by the outer diameter OD 40.2 of an adjacent outer bend 40.2 is at least equal to the value of the outer diameter OD40.2 of an outer bend 40.2 subtracted by the outer diameter OD42.2 of the adjacent inner bend 42.2. This could be expressed with the following formula:

$$OD38.2 - OD40.2 \Rightarrow OD40.2 - OD42.2$$

In the description of the first embodiment, it has already been explained how this better protects the bellows 30.2.

Each skirt 38.2 defines an axial extension AE38.2 along the central axis 28.2. The axial extension AE38.2 of each skirt 38.2 is at least half as big as the axial distance AD40.2 along the central axis 28.2 between the outer bend 40.2 from which the skirt 38.2 extends to the neighboring outer bend 40.2 which is arranged next to the outer end of the respective skirt 38.2 when the bellows 30.2 are extended to their maximum operational length. The maximum operational length but also minimal operation length have been explained above.

Figure 3:
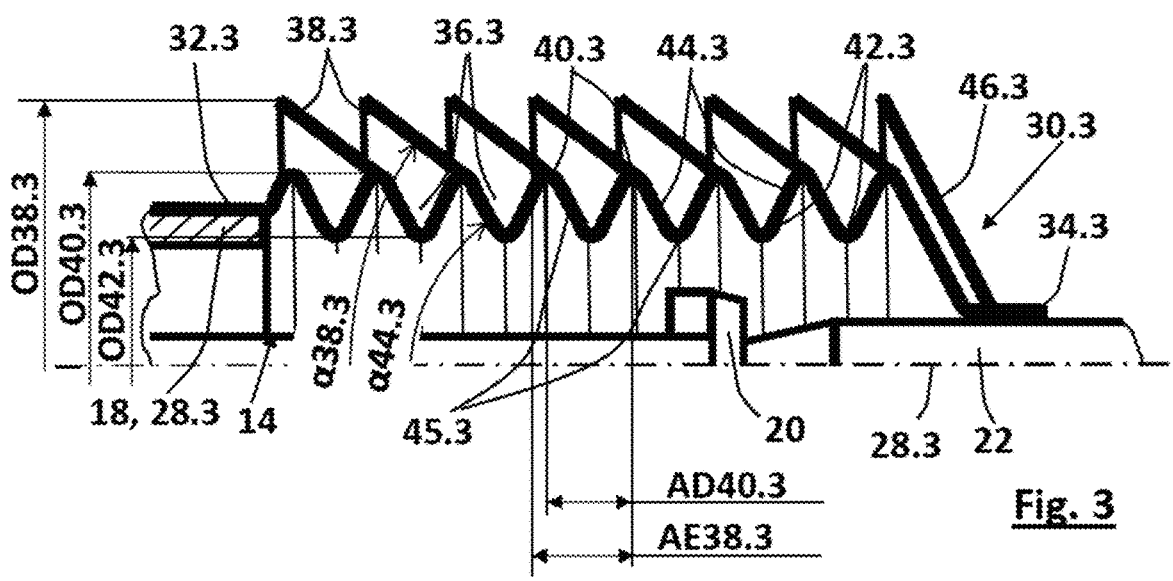
FIG. 3 depicts a bellows according to a third embodiment of the invention.

FIG. 3 depicts a longitudinal section of a third embodiment of a bellows 30.3. Only half a bellows 30.3 is shown. The bellows 30.3 defines a central axis 28.3. The bellows 30.3 comprises a first end 32.3 defining a first opening around the central axis 28.3 and a second end 34.3 defining a second opening around the central axis 28.3. The first end 32.3 may be connected to the outside of the end sections 26 of the housing 18. The second end 34.3 may be connected to the tie rod 22. Several annular folds 36.3 are arranged along the central axis 28.3 between the first end 32.3 and second end 34.3. The bellows 30.3 comprises a plurality of skirts 38.3 arranged along the central axis 28.3. The skirts 38.3 extend away from the bellows 30.3 and their open ends may face the first end 32.3 or, when mounted, the end sections 26 of the housing 18. The bellows 30.3 have 13 folds 36.3. Beginning at the first end 32.3, the first ten folds 36.3 have the same outer diameter. The outer diameters of the next three folds 36.3 decrease towards the second end 34.3. Skirts 38.3 are arranged on seven of the folds 36.3, notably on the second to ninth fold. But it may be possible to arrange skirts 38.3 on more or fewer of the folds 36.3. The skirts 38.3 open towards the first end 32.3 which can be connected to the end section 26 of the housing 18. The skirts 38.3 are arranged on outer bends 40.3 of at least some folds 36.3.

The skirts 38.3 have opening angles 38.3 of less than 180°, in the depicted example the angle is approximately 60°. Each skirt 38.3 encloses the angle α38.3 with the central axis 28.3 that is not bigger than an angle α44.3 that an adjacent first flank 44.3 between an outer bend 40.3 and an inner bend 42.3 encloses with the central axis 28.3 when the bellows 30.3 is extended to its maximum operational length. The angle α44.3 is approximately 120° when the bellows 30.3 is at its original length. The original length is the length of the bellows 30.3 when it is not mounted and/or stretched.

Each fold 36.3 comprises at least the above mentioned outer bend 40.3 with an outer diameter OD40.3 and an adjacent inner bend 42.3 with an outer diameter OD42.3. The outer bend 40.3 and one adjacent inner bend 42.3 are connected by a first flank 44.3. Each skirt 38.3 has an outer diameter OD38.3. The value of an outer diameter OD38.3 of a skirt 38.3 subtracted by the outer diameter OD 40.3 of an adjacent outer bend 40.3 is at least equal to the value of the outer diameter OD40.3 of an outer bend 40.3 subtracted by the outer diameter OD42.3 of the adjacent inner bend 42.3. This could be expressed with the following formula:

$$OD38.3 - OD40.3 \Rightarrow OD40.3 - OD42.3$$

Each skirt 38.3 defines an axial extension AE38.3 along the central axis 28.3. The axial extension AE38.3 of each skirt 38.3 is bigger than the axial distance AD40.3 along the central axis 28.3 between the outer bend 40.3 from which the skirt 38.3 extends to the neighboring outer bend 40.3 which is arranged next to the outer end of the respective skirt 38.3. This may be the case when the bellows 30.3 is extended to its maximum operational length. The meaning of maximum operational length but also minimal operation length was already explained. This may also be the case when the bellows 30.3 is at its original length without being mounted or stretched. When the bellows 30.3, is stretched the skirts 38.3 may not fully cover their neighboring outer bends 40.3 or folds 36.1. But this may still result in better protection for the bellows 30.3.

The embodiment of FIG. 3 depicts an additional skirt 46.3 which is attached to the second end 34.3 and provides additional cover for the first flank closest to the second end 34.3.

The bellows 30.1, 30.2, 30.3 can be made by blow molding or injection molding. They can be made in a single shot. They can be made in two-shots and thereby the skirts 38.1, 38.2, 38.3 may be added in a second shot and with a different material. It is also possible to have, for example, metal skirts 38.1, 38.2, 38.3 that get placed in a mold and then the remainder of the bellows 30.1, 30.2, 30.3 is then added.

While exemplary embodiments are described above, it is not intended that these embodiments describe all possible forms of the disclosed steering rack and bellows. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. Steering system comprising a housing in which a steering rack is movably arranged and extends out of the housing on at least one side of the housing, the steering rack being connected with a tie rod via a ball joint, wherein at least the sections of the steering rack extending outside of the housing and the ball joint are covered by at least one protective bellows defining a central axis and the bellows further comprising a first end defining a first opening around the central axis, a second end defining a second opening around the central axis, and several annular folds arranged along the central axis between the first end and second end, and wherein the bellows comprises a plurality of skirts arranged along the central axis and extending away from the bellows, wherein skirts are arranged on at least some of the annular folds, wherein the skirts are arranged on outer bends of those annular folds on which the skirts are arranged, wherein the skirts extend away from the bellows and their open ends face an end section of the housing, wherein an inner edge of the skirts is attached to the center of a center portion of the outer bends on which the skits are arranged, and wherein the inner edge is followed by an angled portion that defines a frustoconical shape and ends in an outer annular rim.

2. Steering system according to claim 1, wherein each of the skirts defines an angle of less than 180 degrees.

3. Steering system according to claim 1, wherein each fold comprises at least an outer bend with an outer diameter and an adjacent inner bend with an outer diameter, wherein the outer bend and adjacent inner bend are connected with a first flank, wherein each skirt has an outer diameter and wherein the value of an outer diameter of a skirt subtracted by an outer diameter of an adjacent outer bend is at least equal to the value of the diameter of an outer bend subtracted by the outer diameter of the adjacent inner bend.

4. Steering system according to claim 1, wherein each skirt defines an axial extension along the central axis and wherein the axial extension of each skirt is at least as big as the axial distance along the central axis between the outer bend from which the skirt extends to the neighboring outer bend which is arranged next to an outer end of the respective skirt when the bellows is extended to its maximum operational length.

5. Steering system according to claim 1, wherein each skirt encloses an angle with the central axis that is not bigger than an angle that an adjacent first flank between an outer bend and an inner bend encloses with the central axis when the bellows is extended to its maximum operational length.

6. Bellows defining a central axis and comprising a first end defining a first opening around the central axis, a second end defining a second opening around the central axis, and several annular folds arranged along the central axis between the first end and second end, wherein the bellows comprises a plurality of skirts arranged along the central axis and extending away from the bellows, wherein the skirts are arranged on at least some of the annular folds, wherein the skirts are arranged on outer bends of those annular folds on which the skirts are arranged, wherein the skirts extend away from the bellows and their open ends face the first end, wherein an inner edge of the skirts is attached to the center of a center portion of the outer bends on which the skirts are arranged, and wherein the inner edge is followed by an angled portion that defines a frustoconical shape and ends in an outer annular rim.

7. Bellows according to claim 6, wherein each of the skirts defines an angle of less than 180 degrees.

8. Bellows according to claim 6, wherein each fold comprises at least an outer bend with an outer diameter and an adjacent inner bend with an outer diameter, wherein the outer bend and adjacent inner bend are connected with a first flank, wherein each skirt has an outer diameter and wherein the value of an outer diameter of a skirt subtracted by an outer diameter of an adjacent outer bend is at least equal to the value of the diameter of an outer bend subtracted by the outer diameter of the adjacent inner bend.

9. Bellows according to claim 6, wherein each skirt defines an axial extension along the central axis and wherein the axial extension of each skirt is at least as big as the B the axial distance along the central axis between the outer bend from which the skirt extends to the neighboring outer bend which is arranged next to an outer end of the respective skirt when the bellows is extended to its maximum operational length.

10. Bellows according to claim 6, wherein each skirt encloses an angle with the central axis that is not bigger than an angle that an adjacent first flank between an outer bend and an inner bend encloses with the central axis when the bellows is extended to its maximum operational length.

* * * * *

UNITED STATES PATENT AND TRADEMARK OFFICE
CERTIFICATE OF CORRECTION

| | | |
|---|---|---|
| PATENT NO. | : 11,933,406 B2 | Page 1 of 1 |
| APPLICATION NO. | : 17/943946 | |
| DATED | : March 19, 2024 | |
| INVENTOR(S) | : Nicholas LaGana | |

It is certified that error appears in the above-identified patent and that said Letters Patent is hereby corrected as shown below:

In the Claims

In Claim 9, at Column 8, Lines 7-8: "as big as the B the axial distance" should read --as big as the axial distance--.

Signed and Sealed this
First Day of October, 2024

*Katherine Kelly Vidal*

Katherine Kelly Vidal
*Director of the United States Patent and Trademark Office*